United States Patent [19]

Hiyama et al.

[11] 3,928,275

[45] Dec. 23, 1975

[54] VINYL CHLORIDE RESIN COMPOSITION CONTAINING A LUBRICANT

[75] Inventors: Osamu Hiyama; Kazuo Ito, both of Wakayama, Japan

[73] Assignee: Kao Soap Co., Ltd., Tokyo, Japan

[22] Filed: July 23, 1974

[21] Appl. No.: 491,039

[30] Foreign Application Priority Data
July 24, 1973 Japan.............................. 48-83313

[52] U.S. Cl. ....... 260/31.8 B; 260/31.8 C; 264/300; 264/211
[51] Int. Cl.² ... C08K 5/09; C08K 5/11; B29F 3/00; C08L 27/06
[58] Field of Search....... 260/31.8 B, 31.8 C, 484 P; 264/300, 211; 252/17, 35, 39

[56] References Cited
UNITED STATES PATENTS

| | | | |
|---|---|---|---|
| 2,897,176 | 7/1959 | Rocky et al.......................... | 264/300 |
| 3,341,554 | 9/1967 | Murray et al. ................. | 260/31.8 B |
| 3,356,721 | 12/1967 | Wiley............................. | 260/31.8 B |
| 3,442,837 | 5/1969 | Brotz et al. .......................... | 264/300 |
| 3,640,828 | 2/1972 | Brotz et al. ........................... | 252/35 |

*Primary Examiner*—Allan Lieberman
*Attorney, Agent, or Firm*—Woodhams, Blanchard and Flynn

[57] ABSTRACT

A vinyl chloride resin composition is disclosed which comprises 100 parts by weight of a vinyl chloride resin having incorporated therein, as lubricant, 0.05 to 2.0 parts by weight of a metal salt of a dialkyl citrate, in which the two alkyl groups each have from 12 to 22 carbon atoms and the sum of the number of carbon atoms of the two alkyl groups is from 26 to 44, and the metal is selected from the group consisting of calcium, magnesium and zinc.

6 Claims, 1 Drawing Figure

| RATING MARKS | STATE OF RESINS |
|---|---|
| 5 | 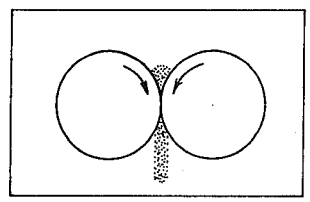 |
| 4 | 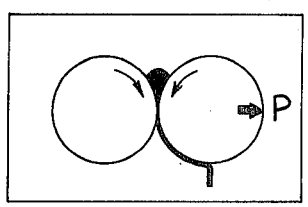 |
| 3 | 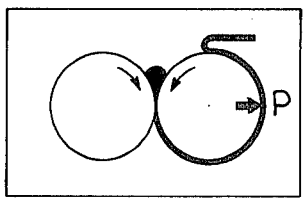 |
| 2 | 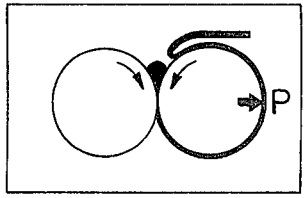 |
| 1 | 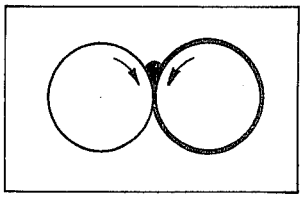 |

VINYL CHLORIDE RESIN COMPOSITION CONTAINING A LUBRICANT

BACKGROUND OF THE INVENTION

1. Field of the Invention

This invention relates to a vinyl chloride resin composition having a workability which has been improved by imparting thereto an excellent lubricity or releasing property by incorporating therein a small amount of a metal salt of a dialkyl ester of citric acid in which the two alkyl groups have a total of 26 to 44 carbon atoms, more particularly, a calcium, magnesium or zinc salt of such dialkyl citrate.

2. Description of the Prior Art

Generally, a heat stabilizer is incorporated into vinyl chloride resins before such resins are subjected to a molding process. Nearly all of such heat stabilizers have some lubricity. However, in actual practice, their lubricities are insufficient in many cases, and lubricants are also used for supplementing the insufficient lubricities of the heat stabilizers.

As lubricants for vinyl chloride resin, there have been used monobasic higher fatty acids or esters thereof, amides such as methylene bis-stearoamide, ketone waxes such as stearone and various other waxes. However, many of those known lubricants are excessively soluble in the resin under the processing conditions of high temperature and long periods of time and it is thus impossible for a moderate lubricating film to form between the resin and the metal surface of the molding machine, whereby a sufficient releasing effect is not exhibited.

SUMMARY OF THE INVENTION

We have discovered that vinyl chloride resins exhibit an excellent, long-lasting lubricity even under conditions of high temperature and over a long period of time if 0.05 to 2.0 parts by weight of a metal salt of dialkyl citrate, wherein the two alkyl groups, which can be the same or different, each has from 12 to 22 carbon atoms and the sum of the number for carbon atoms of the two alkyl groups is from 26 to 44 and the metal is selected from the group consisting of calcium, magnesium and zinc, is incorporated as lubricant in 100 parts by weight of the resin prior to the molding step, whereby an excellent releasing property is obtained.

The metal salts of dialkyl citrates used in the present invention can be obtained by the dehydration esterification of 1 mole of citric acid with 2 moles of an aliphatic monohydric alcohol having 12 to 22 carbon atoms in the usual manner, followed by conversion of the resulting ester to the calcium, magnesium or zinc salt thereof in a known manner. In the conversion of the dialkyl citrate into the corresponding metal salts, the so-called "double decomposition" method (for example, the method described on page 525 of Yushi Kagaku Binran, Second edition) is preferred. However, other methods can be employed provided that the ester groups are not markedly saponified by these methods.

For the purposes of this invention, the dialkyl citrates to be converted to the metal salts need not be pure. The novel lubricity effect is not impaired if small amounts of unreacted diesters or of triesters are contained therein, so long as their total amounts are not in excess of 10 weight percent.

The two alkyl groups of the dialkyl citrates constituting the metal salts of the dialkyl citrates used as lubricant in the present invention have from 26 to 44 carbon atoms in total. Particularly preferred compounds are those containing alkyl groups having 30 to 40 carbon atoms in total. It is not necessary that the two alkyl groups have the same number of carbon atoms, but each of the alkyl groups should have from 12 to 22 carbon atoms.

If the sum of the numbers of carbon atoms of the two alkyl groups is less than 26, the desired lubricating effect is not exhibited. On the other hand, if the sum of the numbers of carbon atoms of the alkyl groups is more than 44, the lubricant is undesirably like paraffin wax and, in addition, there are economic disadvantages due to the difficulty of obtaining the starting materials therefor. As the metals constituting the metal salts, calcium, magnesium and zinc are suitable from the standpoint of lubricating qualities and non-toxicity.

The lubricants used in the present invention can be prepared easily by a known process. An example of the preparation will be shown below. In this example, the calcium salt of distearyl citrate is prepared, but it is to be understood that this is for purposes of illustration of the salts as described above.

Industrial grade citric acid (276 grams, containing one molecule of water of crystallization) and 786 grams of stearyl alcohol (hydroxyl value: 205) are charged in a 2 liter four-neck flask and the reaction mixture is reacted under a nitrogen stream at 170°C for about 2 hours while the water formed by the reaction is removed from the reaction system. After termination of the reaction, the reaction mixture is cooled to obtain 1,000 grams of solidified distearyl citrate. The ester thus obtained has a neutralization value of 79 (theoretical: 80) and a saponification value of 240 (theoretical: 241).

Then, 213 grams of the ester are melted by heating it to 80°C and is mixed with 309 grams of 1 N aqueous sodium hydroxide solution to obtain the sodium salt. The sodium salt is then added dropwise to 2,000 ml. of water containing 500 ml. of methanol as an antifoaming agent and calcium chloride in an amount of twice the theoretical amount, under vigorous stirring. The thus-formed calcium salt of distearyl citrate is recovered from the system and washed repeatedly with a large quantity of ion-exchanged water until the chloride ion is not detected. The thus-obtained powdery calcium salt is air-dried thoroughly to obtain the desired calcium salt of distearyl citrate having a melting point of 60°C and an ash content of 3.76% (theoretical: 3.7%). The metal salt thus obtained is used as a lubricant in the present invention. The corresponding magnesium salt and zinc salt can be prepared easily in substantially the same manner.

The vinyl chloride resins in which are incorporated Ca, Mg or Zn salts of dialkyl citrates as lubricant include polyvinyl chloride resin per se, vinyl chloride/vinyl ester copolymers, vinyl chloride/vinyl ether copolymers, vinyl chloride/vinylidene chloride copolymers and vinyl chloride/lower olefin copolymers. These resins contain at least 50 weight percent of vinyl chloride units, and the balance is one or more monomers copolymerizable with vinyl chloride.

Further, there can be used vinyl chloride resin blends containing vinyl chloride resin as the major component and other polymers as a minor component such as MBS resin (methyl methacrylate/butadiene/styrene resin), ABS resin (styrene/acrylonitrile/butadiene copolymer), styrene/acrylonitrile copolymer styrene/methyl methacrylate copolymer and polystyrene. The vinyl chloride resin is thus a resin in which vinyl chloride constitutes all or a major proportion thereof. In the blends the polyvinyl chloride component constitutes at least 80 weight percent of the total resin.

The amount of the metal salts of dialkyl citrates used in the present invention varies depending upon the molded articles desired to be produced. Generally, the preferred amount of the salts is in the range of 0.05 to 2.0 parts by weight per 100 parts by weight of the resin used (PHR). If the metal salt of the ester is used in an amount less than 0.05 part by weight, the lubricating effect is not achieved. On the other hand, even if it is used in an amount more than 2.0 parts by weight, the effect is not improved but, on the contrary, compounding disadvantages occur.

The present invention thus provides an advantageous process for producing vinyl chloride resins of long-lasting lubricity even under the condition of high temperature as required in the fields of, particularly, calendaring processes and extrusion molding processes.

According to the present invention, the resins do not stick to the metal surfaces of the machines and, therefore, releasing is easy and the processing can be effected smoothly.

The properties of lubricants can be evaluated by methods using various plastometers. However, although such plastometer methods can precisely evaluate the internal lubricating activity, which is one of the functions of the lubricant, the important release effect cannot be evaluated at all by such methods.

In the Examples given hereinafter, the following test roll method was chosen as a test method in which the release effect is manifested most directly.

Processing is conducted by rotating a pair of rolls analogous to calendaring rolls. A fused sheet-like resin wound on one of the rolls is cut at a prescribed processing position. The release effect is evaluated by assigning rating marks, depending on the position where the cut resin is released from the roll and on the state of the resin. The relation between the rating marks and the states of the resin is as shown below:

| Rating Mark | State of Resin |
|---|---|
| 5.0 | Resin is not fused on the roll, and the initial powdery form is not changed. |
| 4.0 | Resin is fused, and when the sheet-like resin wound on the roll surface is cut at a processing position, the cut portion naturally hangs down and the resin is released from the lowermost portion of the roll. |
| 3.0 | Resin is fused, and when the sheet-like resin wound on the roll surface is cut at a processing position, the cut portion naturally curls upwardly and the resin is released from the uppermost portion of the roll. |
| 2.0 | Resin is fused, and when the sheet-like resin wound on the roll surface is cut at a processing position, the cut portion naturally curls upwardly and the resin is released from the vicinity of roll bank (point where fused resin is stored). |
| 1.0 | Resin is fused, and when the sheet-like resin wound on the roll surface is cut at processing position, the resin is not released from the roll. |

In order to obtain lubricating properties and release characteristics necessary for prolonged stable processing of the resin, the resin should have a rating mark in the range of from 3.3 to 4.0, and a mark close to 4.0, for example, 3.5 to 3.8, is preferred. Namely, if a lubricant gives marks within the range of from 3.3 to 4.0 to a vinyl chloride type resin, it can be said that the lubricant exhibits a good lubricating effect.

It will be understood that the resin composition can include additional ingredients, such as stabilizers, pigments, fillers, etc. in the amounts conventionally used in polyvinyl chloride resin compositions.

This invention will now be further described by reference to the following illustrative Examples.

EXAMPLE 1

Test rolls (chilled-steel rolls) having a diameter of 6 inches, a length of 12 inches, relative rotation rate (rpm) of 1/1.1, a clearance of 0.3 mm. and an electrically heated surface at 190°C were used. After melt rolling of the resin around the hot rolls, the degree of sticking of the resin to the rolls was determined at intervals and the results were represented by rating marks according to the evaluation method described above.

Polyvinyl chloride resin alone and a blend of polyvinyl chloride resin and MBS resin (methyl methacrylate/butadiene/styrene resin) were employed as the resins. The resins were incorporated with various lubricants to obtain the samples which were fed to the rolls. The polyvinyl chloride resin used was a resin having a degree of polymerization of about 800 prepared by suspension polymerization.

The test results are shown in Tables 1, 2 and 3. The amounts of ingredients are given in parts by weight.

BRIEF DESCRIPTION OF THE DRAWING

The attached drawing is a sketch showing the relation between the rating marks and the states of the resin in the test roll method for evaluating the roll release effect. The point P indicated by an arrow is the processing position on the roll wound by the fused resin and the cutting was made by using a spatula.

Table 1

| Composition (g) | Comparative Samples | | | | | Referential Samples | | | Samples of Present Invention | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Vinyl chloride polymer resin | 100 | 100 | 100 | 100 | 100 | 100 | 100 | 100 | 100 | 100 | 100 | 100 | 100 |
| SNT-701F * (Stabilizer) | 3 | 3 | 3 | 3 | 3 | 3 | 3 | 3 | 3 | 3 | 3 | 3 | 3 |
| Stearic acid | 0.6 | — | — | — | — | — | — | — | — | — | — | — | — |
| Butyl stearate | — | 0.6 | — | — | — | — | — | — | — | — | — | — | — |
| Calcium stearate | — | — | 0.6 | — | — | — | — | — | — | — | — | — | — |
| Ethylene bis-stearoamide | — | — | — | 0.6 | — | — | — | — | — | — | — | — | — |
| Montanic acid diester of butylene glycol | — | — | — | — | 0.6 | — | — | — | — | — | — | — | — |
| Tristearyl citrate | — | — | — | — | — | 0.6 | — | — | — | — | — | — | — |

Table 1-continued

| Composition (g) | Comparative Samples | | | | | | Referential Samples | | Samples of Present Invention | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Calcium monostearyl citrate | — | — | — | — | — | — | 0.6 | — | — | — | — | — | — |
| Calcium distearyl acetylcitrate | — | — | — | — | — | — | — | 0.6 | — | — | — | — | — |
| Magnesium distearyl citrate | — | — | — | — | — | — | — | — | 0.6 | — | — | — | — |
| Zinc distearyl citrate | — | — | — | — | — | — | — | — | — | 0.6 | — | — | — |
| Calcium dibehenyl citrate | — | — | — | — | — | — | — | — | — | — | 0.6 | — | — |
| Calcium distearyl citrate | — | — | — | — | — | — | — | — | — | — | — | 0.6 | — |
| Calcium myristyl lauryl citrate | — | — | — | — | — | — | — | — | — | — | — | — | 0.6 |
| Roll-Release Characteristics (rating mark) | | | | | | | | | | | | | |
| 3 minutes after rolling | 3.4 | 3.0 | 3.4 | 3.0 | 3.3 | 3.3 | 3.5 | 3.5 | 3.8 | 3.8 | 4.0 | 3.8 | 3.7 |
| 5 minutes after rolling | 3.2 | <3.0 | 3.2 | <3.0 | 3.1 | 3.1 | 3.3 | 3.3 | 3.7 | 3.8 | 3.8 | 3.8 | 3.5 |
| 10 minutes after rolling | 3.0 | <3.0 | 3.1 | <3.0 | <3.0 | <3.0 | 3.2 | 3.2 | 3.7 | 3.7 | 3.8 | 3.7 | 3.4 |

*: Dioctyltin-SS'-bisis(isooctylmercapto acetate)type stabilizer (a product of Sankyo Yuki Co., Ltd.)

Table 2

| Composition (g) | Comparative Samples | | | | | | Referential Samples | | Samples of Present Invention | | | | |
|---|---|---|---|---|---|---|---|---|---|---|---|---|---|
| | 14 | 15 | 16 | 17 | 18 | 19 | 20 | 21 | 22 | 23 | 24 | 25 | |
| Vinyl chloride polymer resin | 93 | 93 | 93 | 93 | 93 | 93 | 93 | 93 | 93 | 93 | 93 | 93 | |
| MBS resin[1] | 7 | 7 | 7 | 7 | 7 | 7 | 7 | 7 | 7 | 7 | 7 | 7 | |
| CZ-11AJ[2] | 1.8 | 1.8 | 1.8 | 1.8 | 1.8 | 1.8 | 1.8 | 1.8 | 1.8 | 1.8 | 1.8 | 1.8 | |
| CZ-15J[2] | 0.6 | 0.6 | 0.6 | 0.6 | 0.6 | 0.6 | 0.6 | 0.6 | 0.6 | 0.6 | 0.6 | 0.6 | |
| Epoxidated soybean oil | 3 | 3 | 3 | 3 | 3 | 3 | 3 | 3 | 3 | 3 | 3 | 3 | |
| CH-55J[3] | 0.4 | 0.4 | 0.4 | 0.4 | 0.4 | 0.4 | 0.4 | 0.4 | 0.4 | 0.4 | 0.4 | 0.4 | |
| Stearic acid | 0.6 | — | — | — | — | — | — | — | — | — | — | — | |
| Butyl stearate | — | 0.6 | — | — | — | — | — | — | — | — | — | — | |
| Stearyl alcohol | — | — | 0.6 | — | — | — | — | — | — | — | — | — | |
| Glycerol monostearate | — | — | — | 0.6 | — | — | — | — | — | — | — | — | |
| Citric acid tristearate | — | — | — | — | 0.6 | — | — | — | — | — | — | — | |
| Calcium monostearyl citrate | — | — | — | — | — | 0.6 | — | — | — | — | — | — | |
| Calcium distearyl acetyl citrate | — | — | — | — | — | — | 0.6 | — | — | — | — | — | |
| Magnesium distearyl citrate | — | — | — | — | — | — | — | 0.6 | — | — | — | — | |
| Zinc distearyl citrate | — | — | — | — | — | — | — | — | 0.6 | — | — | — | |
| Calcium dibehenyl citrate | — | — | — | — | — | — | — | — | — | 0.6 | — | — | |
| Calcium distearyl citrate | — | — | — | — | — | — | — | — | — | — | 0.6 | — | |
| Calcium myristyl lauryl citrate | — | — | — | — | — | — | — | — | — | — | — | 0.6 | |
| Roll-Release Characteristics (rating mark) | | | | | | | | | | | | | |
| 3 minutes after rolling | 3.7 | 3.5 | 3.5 | 3.6 | 3.6 | 3.5 | 3.6 | 3.8 | 3.8 | 3.9 | 3.8 | 3.7 | |
| 5 minutes after rolling | 3.5 | 3.2 | 3.3 | 3.4 | 3.4 | 3.3 | 3.4 | 3.6 | 3.7 | 3.8 | 3.7 | 3.6 | |
| 10 minutes after rolling | 3.2 | 3.0 | 3.0 | 3.0 | 3.1 | 3.3 | 3.3 | 3.5 | 3.5 | 3.7 | 3.5 | 3.5 | |

[1] Tradename BTA-X (a product of Kureha Kagaku Kogyo Co., Ltd.) used for reinforcing vinyl chloride resin
[2] Non-toxic Ca-Zn complex stabilizer approved by FDA (a product of Katsuta Kako Co., Ltd.)
[3] Non-toxic organic complex phosphite stabilizer approved by FDA (a product of Katsuta Kako Co., Ltd.)

Table 3

| Composition (g) | Comparative Samples | | | | | | Referential Samples | | Samples in Present Invention | | | | |
|---|---|---|---|---|---|---|---|---|---|---|---|---|---|
| | 26 | 27 | 28 | 29 | 30 | 31 | 32 | 33 | 34 | 35 | 36 | 37 | |
| Vinyl chloride resin | 100 | 100 | 100 | 100 | 100 | 100 | 100 | 100 | 100 | 100 | 100 | 100 | |
| Dibutyl tin maleate | 3 | 3 | 3 | 3 | 3 | 3 | 3 | 3 | 3 | 3 | 3 | 3 | |
| Stearic acid | 0.6 | — | — | — | — | — | — | — | — | — | — | — | |
| Butyl stearate | — | 0.6 | — | — | — | — | — | — | — | — | — | — | |
| Stearyl alcohol | — | — | 0.6 | — | — | — | — | — | — | — | — | — | |
| Montanic acid diester of butylene glycol | — | — | — | 0.6 | — | — | — | — | — | — | — | — | |
| Tristearyl citrate | — | — | — | — | 0.6 | — | — | — | — | — | — | — | |

Table 3-continued

| Composition (g) | Comparative Samples | | | | | Referential Samples | | Samples in Present Invention | | | | |
|---|---|---|---|---|---|---|---|---|---|---|---|---|
| | 26 | 27 | 28 | 29 | 30 | 31 | 32 | 33 | 34 | 35 | 36 | 37 |
| Calcium monostearyl citrate | — | — | — | — | — | 0.6 | — | — | — | — | — | — |
| Calcium distearyl acetylcitrate | — | — | — | — | — | — | 0.6 | — | — | — | — | — |
| Magnesium distearyl citrate | — | — | — | — | — | — | — | 0.6 | — | — | — | — |
| Zinc distearyl citrate | — | — | — | — | — | — | — | — | 0.6 | — | — | — |
| Calcium dibehenyl citrate | — | — | — | — | — | — | — | — | — | 0.6 | — | — |
| Calcium distearyl citrate | — | — | — | — | — | — | — | — | — | — | 0.6 | — |
| Calcium myristyl lauryl citrate | — | — | — | — | — | — | — | — | — | — | — | 0.6 |
| Roll-release Characteristics (rating mark) | | | | | | | | | | | | |
| 3 minutes after rolling | <3.0 | <3.0 | <3.0 | 3.2 | 3.2 | 3.3 | 3.4 | 3.6 | 3.5 | 3.7 | 3.5 | 3.4 |
| 5 minutes after rolling | <3.0 | <3.0 | <3.0 | 3.1 | 3.1 | 3.2 | 3.3 | 3.5 | 3.5 | 3.6 | 3.5 | 3.4 |
| 10 minutes after rolling | <3.0 | <3.0 | <3.0 | 3.1 | 3.0 | 3.2 | 3.2 | 3.4 | 3.4 | 3.6 | 3.4 | 3.3 |

As is clearly shown by the results of Tables 1 through 3, vinyl chloride resin compositions in which are incorporated a small amount of a metal salt of a dialkyl citrate according to the present invention have excellent lubricating effects. After the treatment at a high temperature of 190°C for 10 minutes, they maintain a suitable lubricity. Thus, they are quite satisfactory in practice.

EXAMPLE 2

In the same composition as in Example 1 shown in Table 3, i.e. a composition comprising 100 grams of polyvinyl chloride resin and 3 grams of dibutyl tin maleate, there was used one gram of either calcium dimyristyl citrate (Sample No. 38) or calcium dipalmityl citrate (Sample No. 39), in place of the 0.6 grams of the lubricant. Examination was effected in the same manner and under the same conditions as in Example 1. The rating marks at 3, 5 and 10 minutes after the rolling-up of the sheets of the resin containing 1.0 gram of calcium dimyristyl citrate or 1.0 gram of calcium dipalmityl citrate were within the range of 3.5–3.8. Thus, the excellent lubricating effects were manifested. For comparison, 0.02 gram and 10 grams of the same lubricants were incorporated in the resin. In the case in which the lubricants were incorporated in an amount of 0.02 gram, the sheets were inclined to stick to the rolls and the rating mark 10 minutes after the rolling was 1.0 which indicates an inferior result.

In the case in which the lubricants were incorporated in an amount of 10 grams, a practical advantageous lubricating effect superior to the case of 1.0 gram could not be obtained.

The embodiments of the invention in which an exclusive property or privilege is claimed are defined as follows:

1. A vinyl chloride resin composition having incorporated therein, as lubricant, from 0.05 to 2.0 parts by weight, per 100 parts of a vinyl chloride resin, of a metal salt of a dialkyl citrate in which the alkyl groups contain a total of 26 to 44 carbon atoms and each of the alkyl groups contains from 12 to 22 carbon atoms, and the metal is selected from the group consisting of calcium, magnesium and zinc, said vinyl chloride resin being selected from the group consisting of polyvinyl chloride, copolymers containing at least 50 weight percent of vinyl chloride units and the balance is units of one or more monomers copolymerizable with vinyl chloride, and polymer blends containing at least 80 weight percent of polyvinyl chloride and the balance being another polymer compatible with polyvinyl chloride.

2. A composition according to claim 1 wherein said vinyl chloride resin is selected from the group consisting of polyvinyl chloride, a vinyl chloride/vinyl ester copolymer, a vinyl chloride/vinyl ether copolymer, a vinyl chloride/vinylidene chloride copolymer, a vinyl chloride/lower olefin copolymer, a resin blend of polyvinyl chloride as major component and a minor component selected from the group consisting of an MBS resin, an ABS resin, a styrene/acrylonitrile copolymer, a styrene/methyl methacrylate copolymer and polystyrene.

3. A resin composition according to claim 2 wherein said vinyl chloride resin is polyvinyl chloride.

4. A resin composition according to claim 2 wherein said vinyl chloride resin is a blend of a major proportion of polyvinyl chloride and a minor proportion of MBS resin.

5. A resin composition according to claim 2 wherein said lubricant is a member of the group consisting of magnesium distearyl citrate, zinc distearyl citrate, calcium dibehenyl citrate, calcium distearyl citrate, and calcium myristyl lauryl citrate.

6. In a method of forming a vinyl chloride molded article which comprises molding of vinyl chloride resin by calendaring or extrusion molding in the thermoplastic state, the improvement which comprises incorporating into said resin, as lubricant, prior to molding, from 0.02 to 2.0 parts, per 100 parts of said resin, of a metal salt of a dialkyl citrate in which the alkyl groups contain a total of 26 to 44 carbon atoms and each of the alkyl groups contains from 12 to 22 carbon atoms, and the metal is selected from the group consisting of calcium, magnesium and zinc, said vinyl chloride resin being selected from the group consisting of polyvinyl chloride, copolymers containing at least 50 weight percent of vinyl chloride units and the balance is units of one or more monomers copolymerizable with vinyl chloride, and polymer blends containing at least 80 weight percent of polyvinyl chloride and the balance being another polymer compatible with polyvinyl chloride.

* * * * *